United States Patent [19]

Nomura et al.

[11] Patent Number: 5,581,411
[45] Date of Patent: Dec. 3, 1996

[54] GUIDE DEVICE FOR ZOOM LENS BARREL

[75] Inventors: Hiroshi Nomura; Takamitsu Sasaki, both of Tokyo, Japan

[73] Assignee: Asahi Kogaku Kogyo Kabushiki Kaisha, Tokyo, Japan

[21] Appl. No.: 353,209

[22] Filed: Dec. 1, 1994

[30] Foreign Application Priority Data

Dec. 6, 1993 [JP] Japan .................. 5-065079 U

[51] Int. Cl.[6] ........................ G02B 15/14
[52] U.S. Cl. .................. 359/694; 359/704; 359/822
[58] Field of Search .................. 359/696, 704, 359/694, 695, 819, 822, 826; 354/403

[56] References Cited

U.S. PATENT DOCUMENTS

4,560,237  12/1985  Ohkura et al. ................ 350/255
4,944,030   7/1990  Haraguchi et al. ............. 354/403
4,974,949  12/1990  Tanaka ........................... 350/429
5,144,493   9/1992  Nomura .......................... 359/700
5,196,963   3/1993  Sato et al. ..................... 359/699
5,245,476   9/1993  Shona ............................ 359/699

*Primary Examiner*—Georgia Y. Epps
*Assistant Examiner*—Dawn-Marie Bey
*Attorney, Agent, or Firm*—Greenblum & Bernstein P.L.C.

[57] ABSTRACT

A guide device for a zoom lens barrel which includes a movable cylinder linearly guided in a direction of the optical axis of a zoom lens, a pinion rotatably supported on the movable cylinder, with a part of the pinion projecting from an outer surface of the movable cylinder. The guide device further includes a driving mechanism for rotating the pinion, a zooming mechanism for moving a plurality of lens groups of the zoom lens by rotation of the pinion to change a focal length, and a straight guide projection formed on an outer surface of the movable cylinder. The pinion is situated close to the straight guide projection.

20 Claims, 10 Drawing Sheets

GUIDE DEVICE FOR ZOOM LENS BARREL

BACKGROUND OF THE INVENTION

1. Field of the Invention

The present invention relates to a guide device for linearly guiding a zoom lens barrel.

2. Description of the Related Art

In recent years, compact cameras with a telescoping type zoom lens having more than two telescoping lens barrels have been manufactured in order to reduce the thickness of the camera when the zoom lens is retracted in the camera body. In such cameras, a pinion of a drive mechanism for driving the zoom lens is generally provided on one of the telescoping lens barrels, with a portion of the teeth of the pinion projecting from the outer periphery of the one of the telescoping lens barrels so as to transmit a driving force from the one of the telescoping lens barrels to another telescoping lens barrel fitted in the one of the telescoping lens barrels.

When a strong driving force is applied to the pinion and the stiffness of the structure supporting the pinion shaft is insufficient, the supporting portion will deflect, which may cause the efficiency of transmitting the driving force using the pinion to be reduced. This problem may be solved by increasing the stiffness of the supporting portion of the telescoping lens barrel using metal or the like, however, this may cause problems of increased production costs and an increased weight of the final product.

SUMMARY OF THE INVENTION

The present invention has been achieved to eliminate the above drawbacks, and the object thereof is to provide a guide device for linearly guiding the zoom lens barrel with the pinion projecting from the outer periphery thereof, wherein the transmission efficiency of the driving force of the pinion is not decreased, while at the same time the stiffness of a portion of the lens barrel or of the lens barrel itself does not have to be increased.

The present invention has been designed from the viewpoint that in a linearly guided lens barrel, a portion of the lens barrel adjacent to a straight guide projection has a higher stiffness, in comparison with the other portions thereof, since the straight guide projection, which projects from the outer surface of the lens barrel, engages a straight guide groove for slidably guiding the projection.

According to one aspect of the present invention, there is provided a guide device for a zoom lens barrel that includes a movable cylinder linearly guided in a direction of an optical axis of a zoom lens, a pinion rotatably supported on the movable cylinder, with a part of the pinion projecting from an outer surface of the movable cylinder, and a driving mechanism for rotating the pinion. A zooming device for moving a plurality of lens groups of the zoom lens by rotation of the pinion to change a focal length is provided and, a straight guide projection is formed on an outer surface of the movable cylinder, wherein the pinion is situated close to the straight guide projection.

According to another aspect of the present invention, there is provided a guide device for a zoom lens barrel that includes a movable cylinder linearly guided in a direction of an optical axis of a zoom lens. A guide projection is formed on an outer periphery of the movable cylinder and a pinion rotatably supported on the movable cylinder such that a part of teeth of the pinion projects from an outer periphery of the guide projection.

The present disclosure relates to subject matter contained in Japanese utility model application No. 5-65079 (filed on Dec. 6, 1993) which is expressly incorporated herein by reference in its entirety.

BRIEF DESCRIPTION OF THE DRAWINGS

The present invention will be more apparent from the following description with reference to the accompanying drawings.

DETAILED DESCRIPTION OF PREFERRED EMBODIMENTS

In this embodiment, a zooming lens system includes a front lens group L1 and a rear lens group L2. A focusing operation is carried out by means of the front lens group L1 as it travels in the optical axis direction O.

Figure 8:
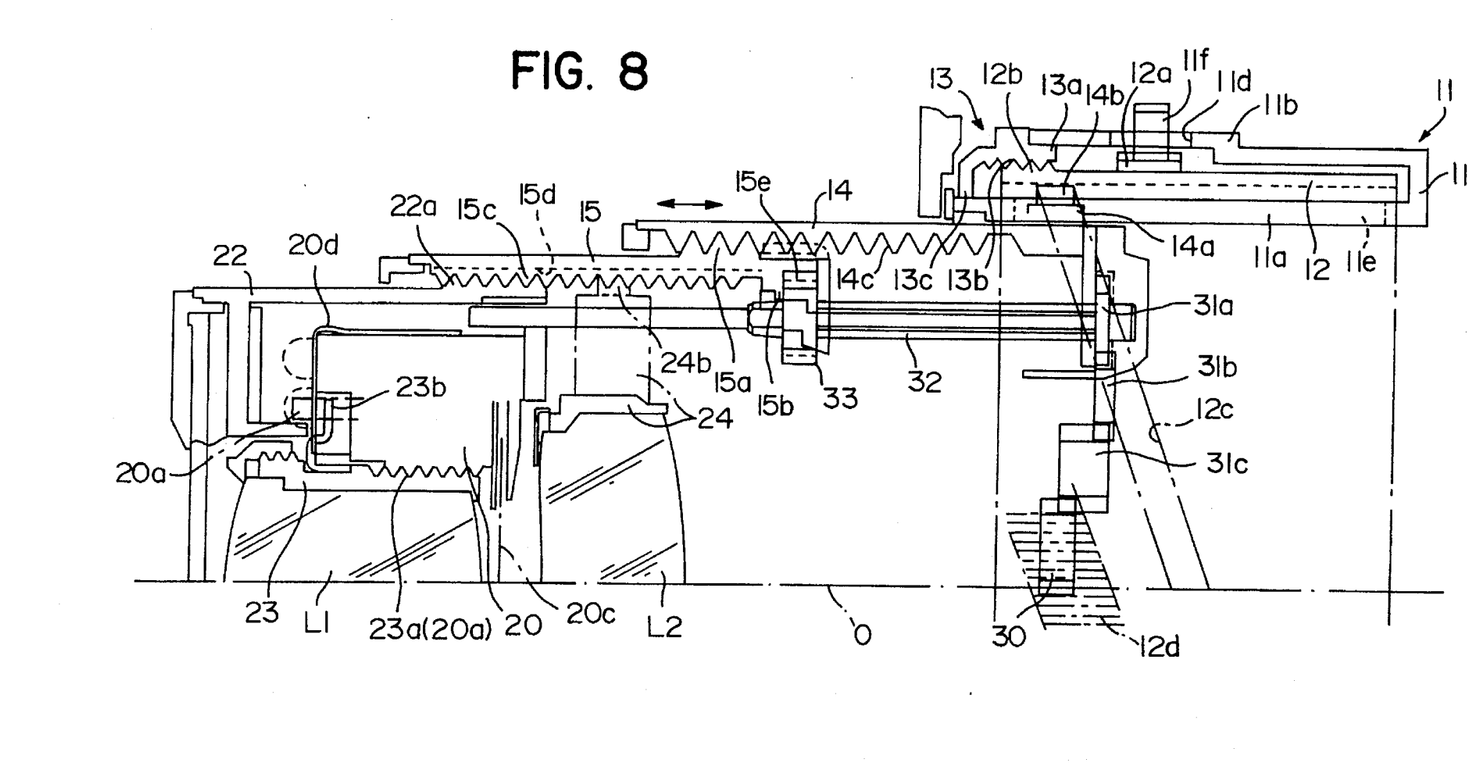
FIG. 8 is a lateral cross-sectional view of the upper half of the extended lens barrel according to the present invention.

A fixed lens barrel 11 is integrally formed with the camera body and is provided with an inner cylinder 11a and an outer cylinder 11b. The rear ends of the inner and outer cylinders 11a and 11b are connected to each other through a connecting wall 11c, and the front ends of the cylinders 11a and 11b are open. A rotation cylinder (i.e., driving means) 12, which is inserted from the open end of the cylinders 11a and 11b, is rotatably mounted on the outer periphery of the inner cylinder 11a. Three straight guide grooves 11e each extending in a direction parallel to the optical axis O are formed on the inner cylinder 11a. Only one of the three straight guide grooves 11e is shown in FIG. 8.

Figure 1:
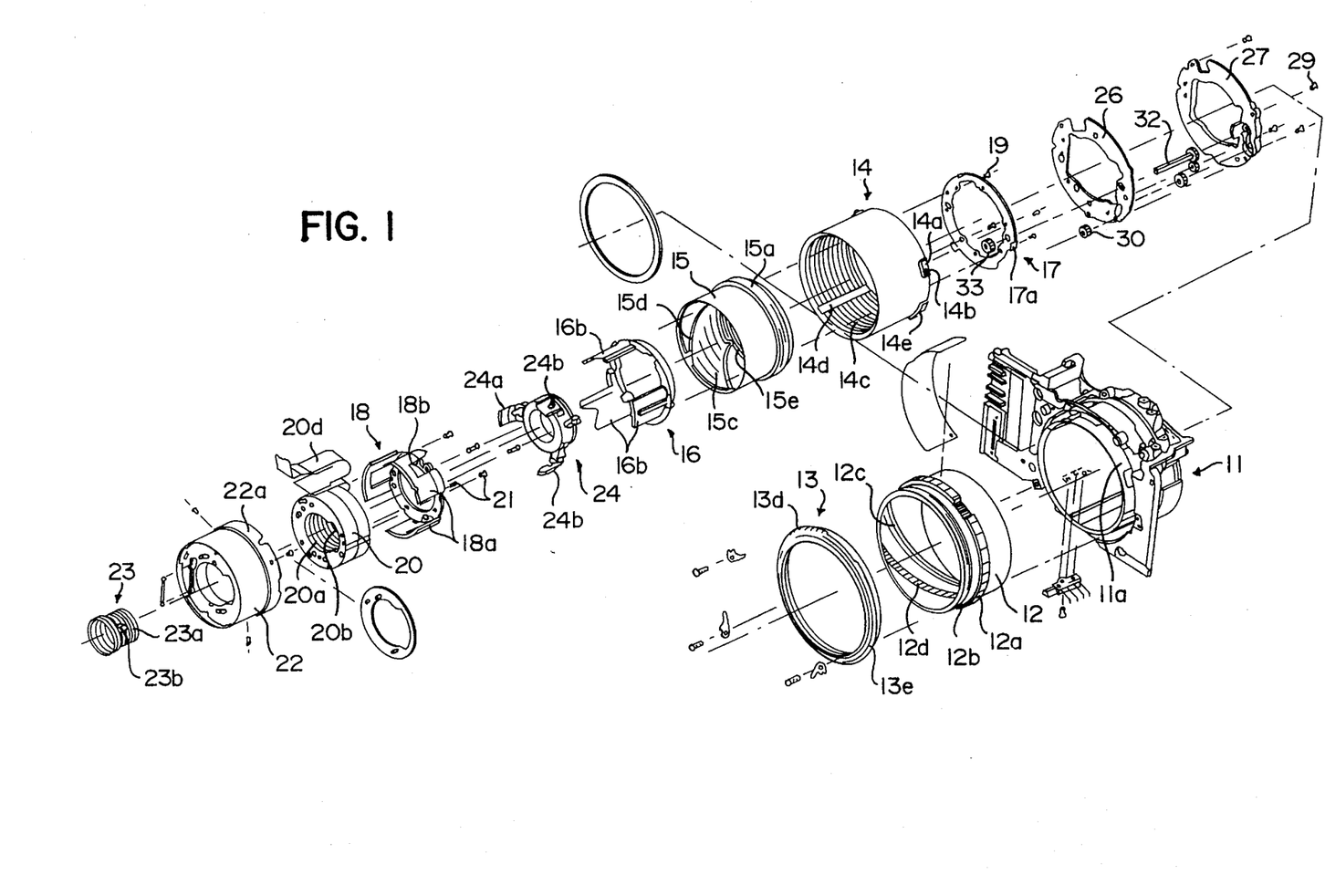
FIG. 1 is an exploded isometric view of an overall zoom lens barrel according to an embodiment of the present invention.
Figure 2:
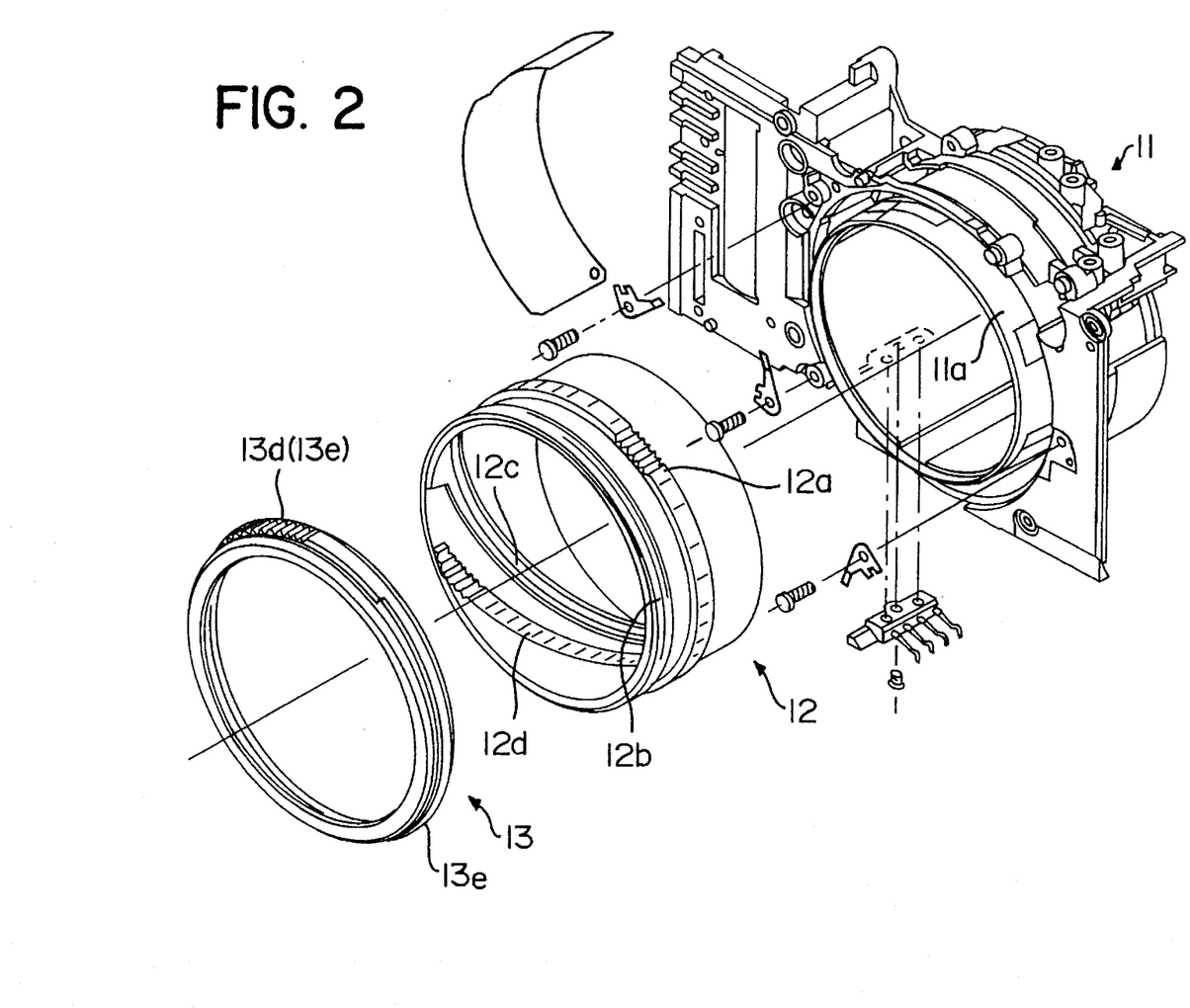
FIG. 2 is an enlarged isometric view of the rear portion of the zoom lens barrel shown in FIG. 1.

A spur gear 12a is integrally formed with the rotation cylinder 12 on an outer periphery thereof, and a fine thread 12b is integrally formed with the cylinder 12 at a tip of the outer peripheral portion thereof. On the inner wall of the rotation cylinder 12 are formed three lead grooves 12c parallel to one another and each inclined in a circumferential direction of the cylinder 12, and an inclined inner gear 12d parallel to the lead grooves 12c. Only one of the three lead grooves 12c is shown in FIGS. 2 and 8.

A support ring 13 is secured to the front end opening of the inner cylinder 11a and outer cylinder 11b of the fixed lens barrel 11. The supporting ring 13 includes a portion 13a engaging the inner surface of the outer cylinder 11b; a thread portion 13b engaging the fine thread 12b; a portion 13c contacting an outer surface of the inner cylinder 11a; and an outer flange 13e. The support ring 13 is biased toward the fixed lens barrel 11 by a spring means (not shown) and is retained at a predetermined position. Reference symbol 13d is a gear formed on an outer periphery of the support ring 13 for the adjustment the position of the rotation cylinder 12 in the optical axis direction O. The support ring 13 also functions to strengthen the edge of the inner cylinder 11a and the outer cylinder 11b.

A notch 11d for allowing the pinion 11f to mesh with the spur gear 12a is provided on the outer cylinder 11b of the fixed lens barrel 11, and other notches similar to the notch 11d are formed on the inner cylinder 11a to expose the lead grooves 12c and the inclined gear 12d.

Figure 3:
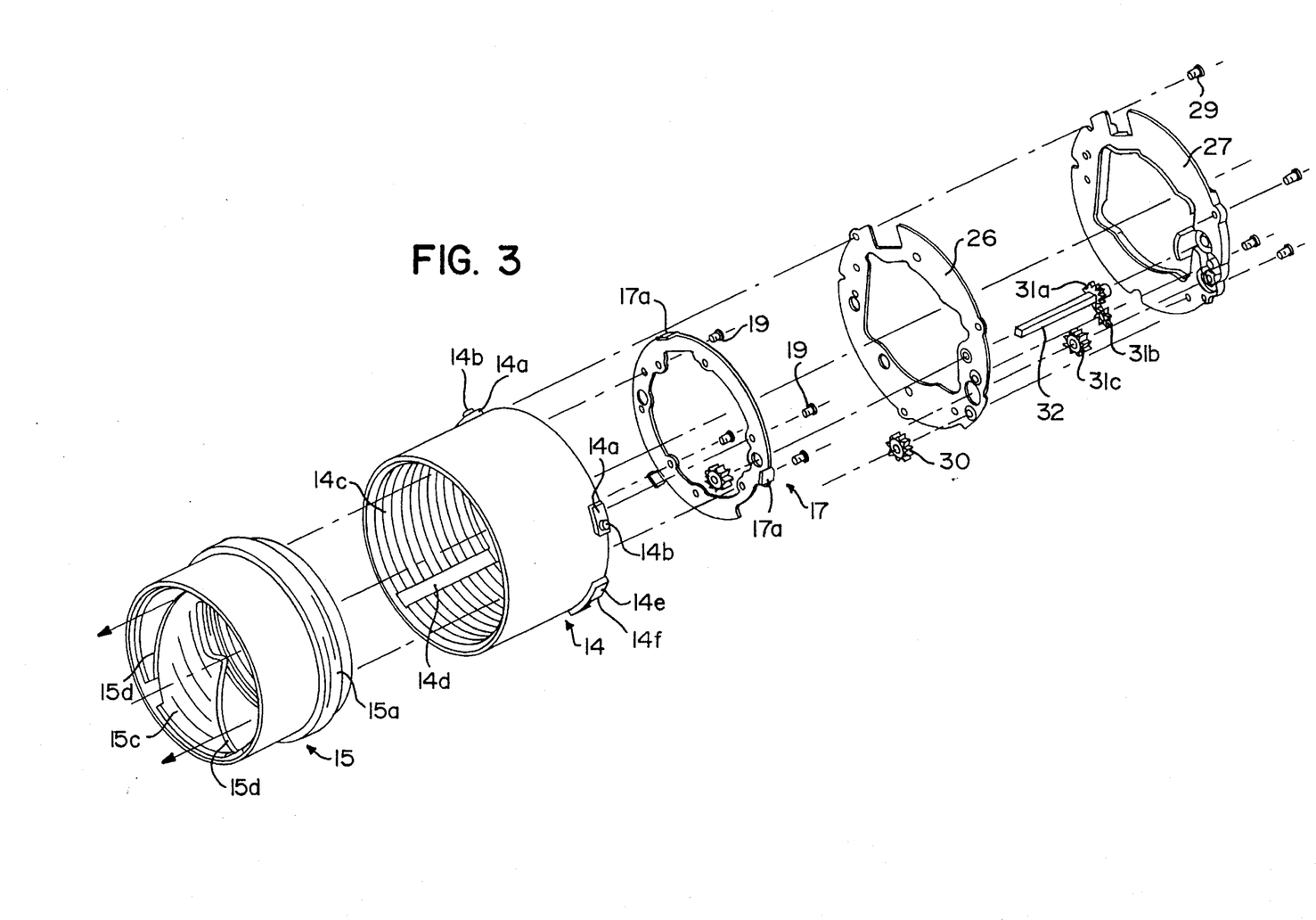
FIG. 3 is an enlarged isometric view of the intermediate portion of the zoom lens barrel shown in FIG. 1.
Figure 4:
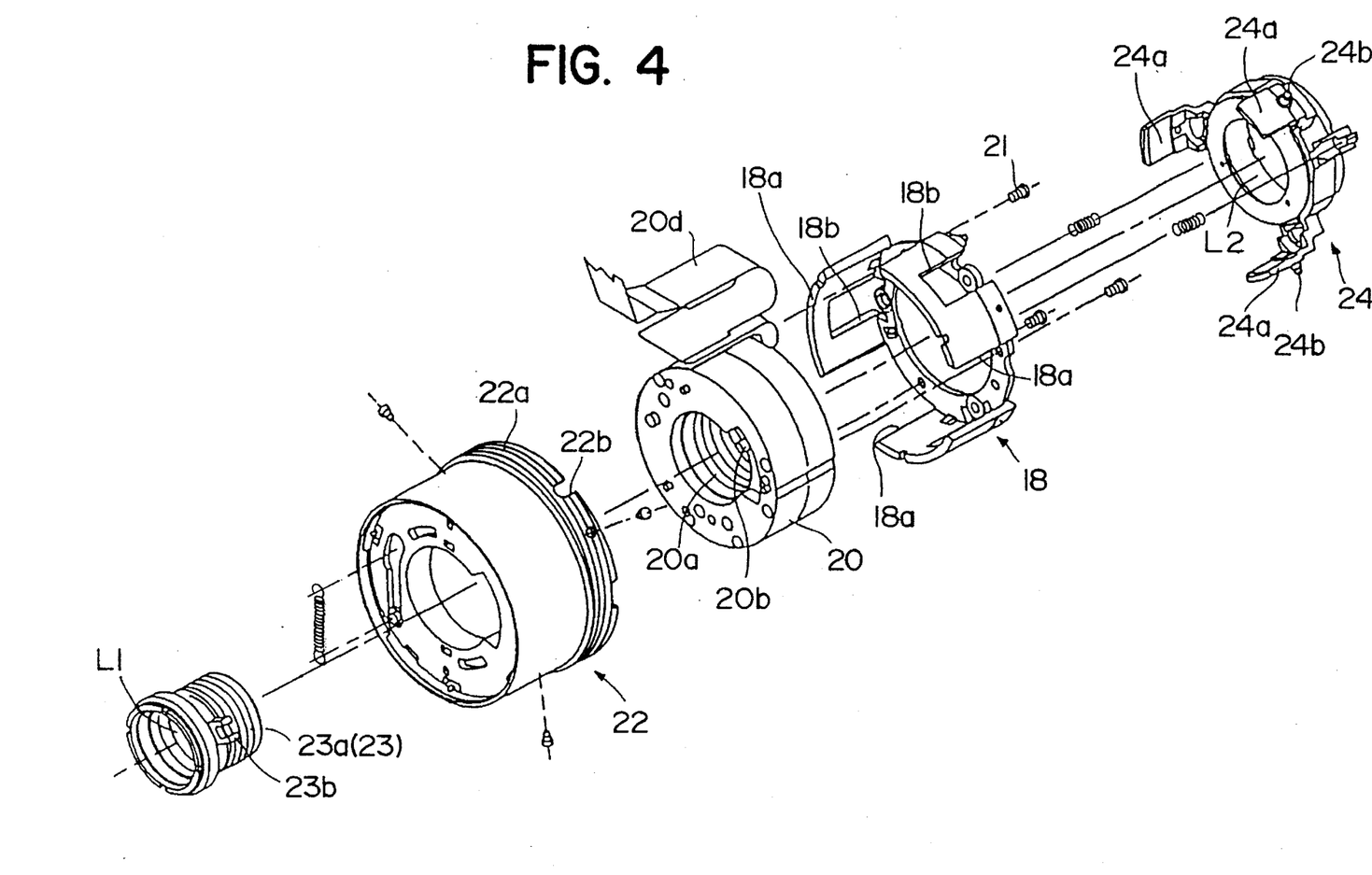
FIG. 4 is an enlarged isometric view of the front portion of the zoom lens barrel shown in FIG. 1.
Figure 5:
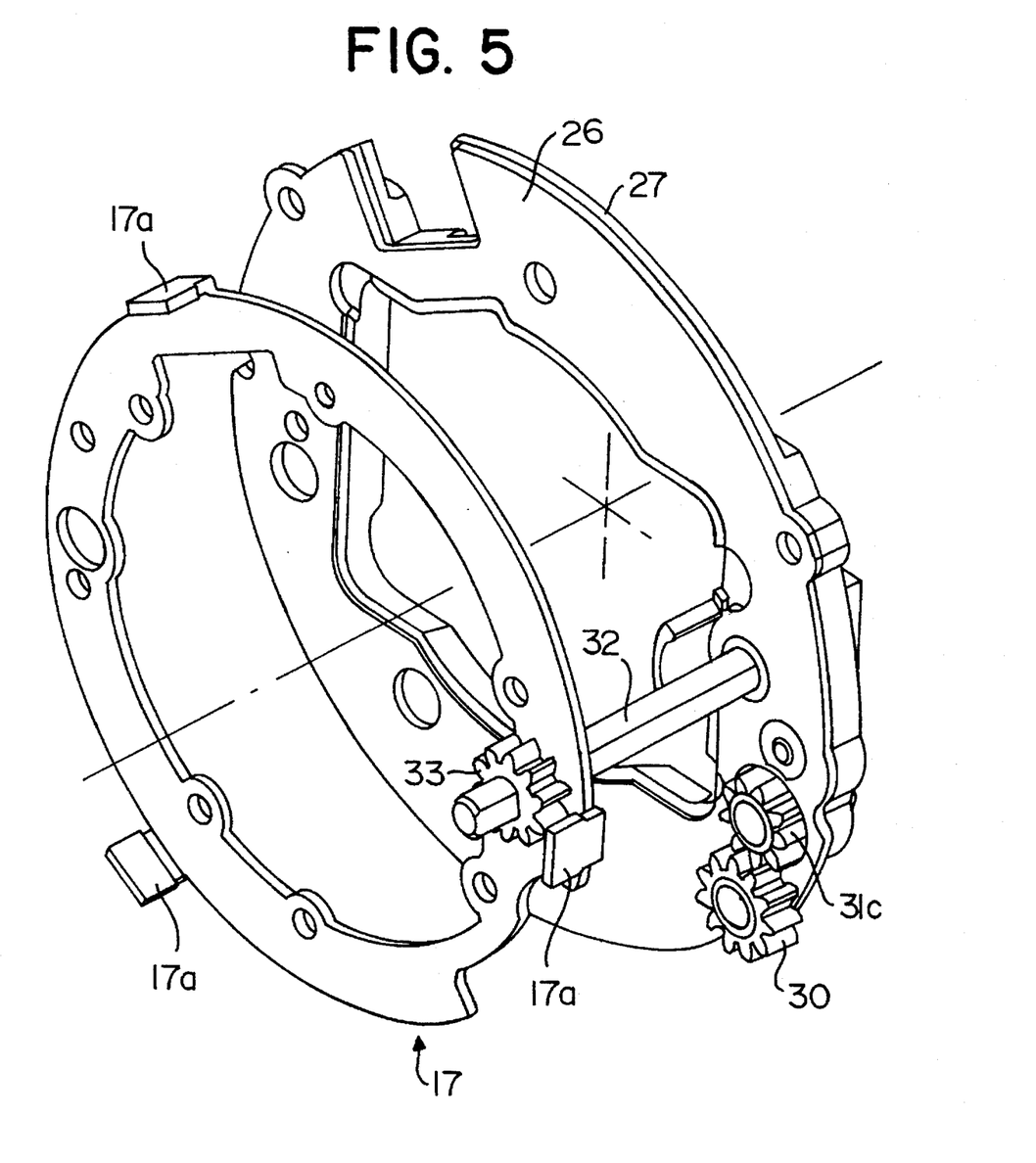
FIG. 5 is an isometric view of a supporting mechanism for a driving system of the zoom lens barrel shown in FIG. 1.
Figure 6:
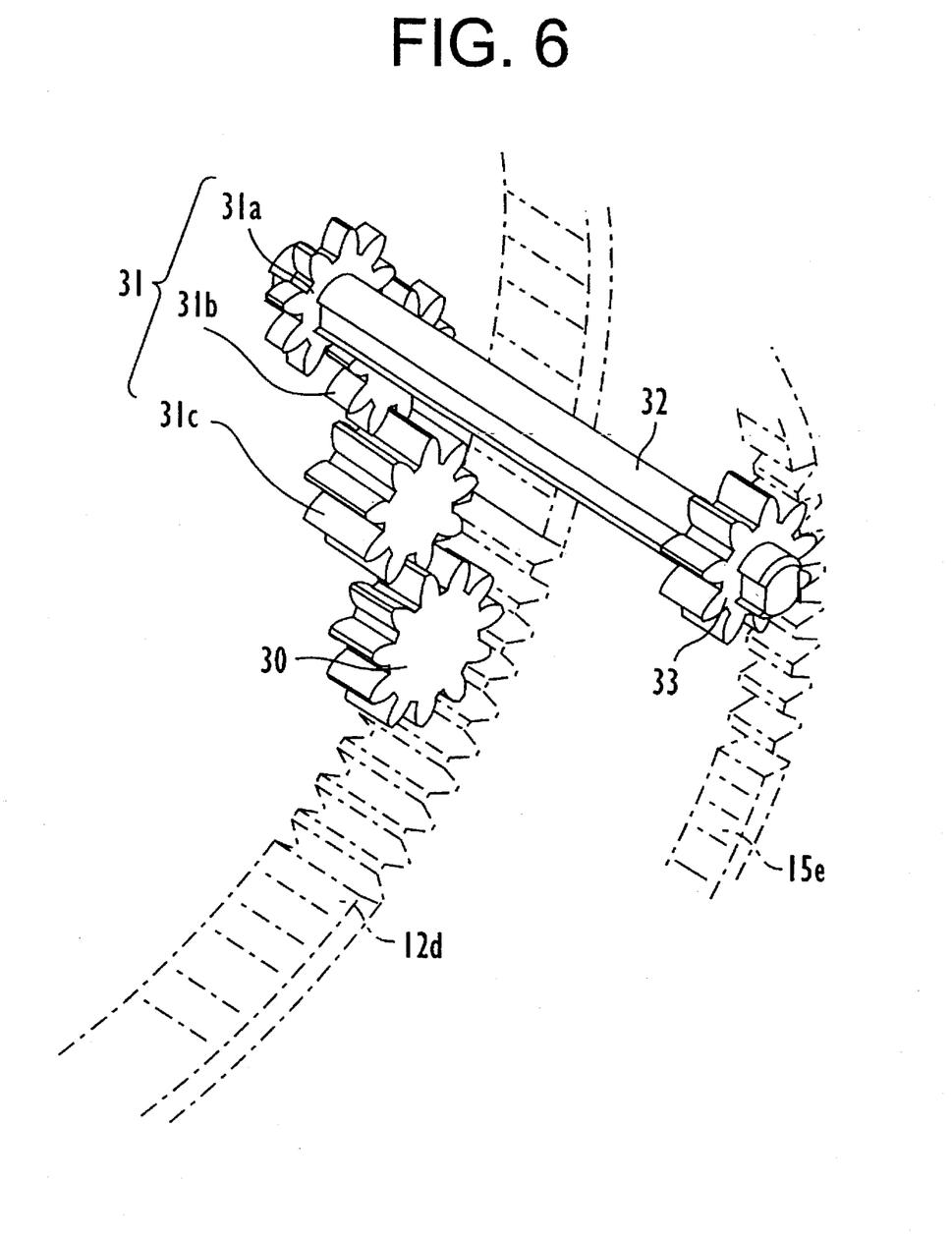
FIG. 6 is an isometric view of gears of the driving system shown in FIG. 5.

A first cylinder (i.e., movable cylinder) 14 which moves in the optical axis direction O and fits in the inner cylinder 11a of the fixed lens barrel 11 is provided. Three straight guide projections 14a are integrally formed with the outer periphery of the first cylinder 14 and engage the guide grooves 11e of the fixed lens barrel 11. Only one of the three straight guide projections 14a is shown in FIG. 8. A pin 14b engaging the corresponding lead groove 12c of the rotation cylinder 12 is formed on each of the guide projections 14a. A female helicold 14c and three straight guide grooves 14d parallel to the optical axis O are formed on the inner wall of the first cylinder 14. Only one of the three straight guide grooves 14d can be seen in FIG. 3. With the construction described above, the rotation of the rotation cylinder 12 causes the first cylinder 14 to move in the optical axis direction O without rotating by means of the guide grooves 11e and the lead grooves 12c.

Figure 7:
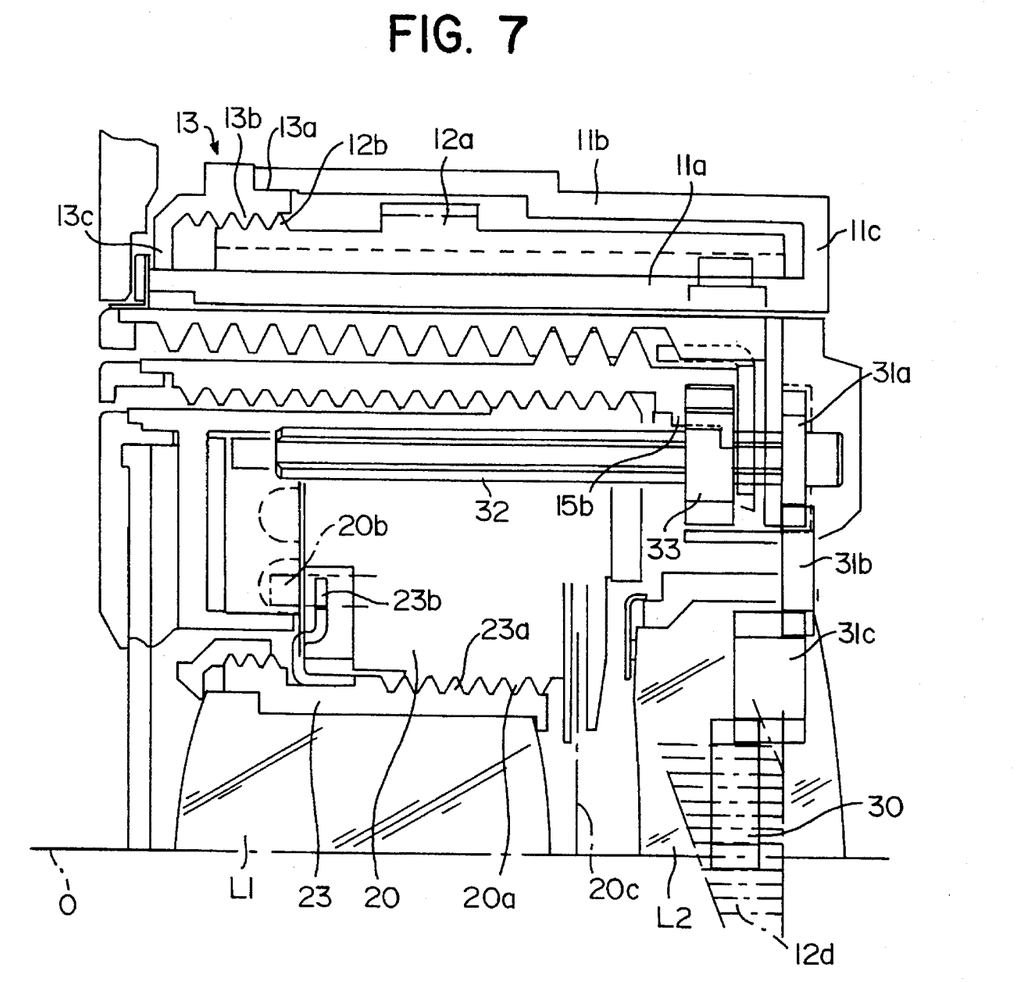
FIG. 7 is a lateral cross-sectional view of the upper half of the accommodated lens barrel according to the present invention.

Inside the first cylinder 14 is accommodated a second cylinder 15, and at a rear portion of the outer periphery of the second cylinder 15 is formed a male helicoid 15a which engages the female helicold 14c of the first cylinder 14. A straight guide member 16 is situated in the second cylinder 15, and a straight guide plate 17 is fixed by fastening screws 19 to a rear end portion of the guide member 16. An inner flange 15b is integrally formed with the second cylinder 15 between the guide member 16 and the guide plate 17 so as to rotate in relation to the guide member 16 and the guide plate 17 as illustrated in FIGS. 7 and 8. Three straight guide keys 17a are formed on the periphery of the guide plate 17 and engage the guide grooves 14d. As a result, the guide member 16 and the guide plate 17 rotate in relation to the second cylinder 15 and integrally move in the optical axis direction. In other words, the second cylinder 15 is rotatable and movable in the direction of optical axis at the same time by means of the male and female helicoids 15a and 14c. Also the guide member 16 and the guide plate 17 are movable together with the second cylinder 15 in the optical axis direction without rotating.

The guide member 16 is provided with three straight keys 16b each extending in a direction parallel to the optical axis O. A guide member 18 for linearly guiding the front lens group L1 is provided with three straight keys 18a engaging the keys 16b. A shutter block 20 is secured to the front lens group guide member 18 through the fastening screws 21 and is further secured to the front lens group supporting cylinder 22. As a result, the shutter block 20 and the front lens group supporting cylinder 22 are prevented from rotating and are allowed to move only in the optical axis direction O.

The shutter block 20 is provided on its inner periphery with a female helicoid 20a extending parallel to the optical axis O, and a male helicoid 23a of a lens supporting ring 23 supporting the front lens group L1 is engaged with the female helicold 20a. The shutter block 20, as is widely known, rotates the front lens frame 23 by means of the helicoids 20a and 23a through a driving pin 20b and a projection 23b in accordance with the subject distance signals from a distance measuring device (not shown), and then the shutter block 20 moves the lens frame 23 toward a focal point. At the rear portion of the outer periphery of the front lens group supporting cylinder 22, a male helicold 22a is formed to move the front lens frame 23 in the optical axis direction O during a zooming operation. The shutter block 20 is provided with blades 20c, and driving signals are supplied to the shutter block 20 through a flexible printed circuit board (FPC board) 20d.

A rear lens group guiding slot 18b is formed on each of the front lens group guide members 18 for linearly moving the rear lens group L2 in the optical axis direction O. The rear lens group L2 is secured to the rear lens frame 24. Three straight keys 24a engaging the rear lens group guiding slots 18b are formed on the rear lens frame 24. A cam pin 24b is formed on each of the keys 24a so as to project in a radial direction therefrom.

A female helicoid 15c and three cam grooves 15d are formed on the inner periphery of the second cylinder 15. The female helicoid 15c engages a male helicoid 22a of the front lens group supporting cylinder 22, and the cam grooves 15d engage the cam pins 24b of the rear lens frame 24. The cam grooves 15d meet with the female helicold 15c such that a part of the female helicoid 15c is removed. When assembled, the cam pins 24b of the rear lens frame 24 are engaged with open grooves 22b of the front lens group supporting cylinder 22. Under this condition, the cam pins 24b are engaged with the cam grooves 15d and the male helicoid 22a is engaged with the female helicoid 15c. Under these conditions, the rotation of the second cylinder 15 causes the front lens group supporting cylinder 22 (front lens group L1) to linearly move in the optical axis direction O due to the relationship between the female helicoid 15c and the male helicold 22a and between the keys 16b of the guide member 16 and the keys 18a of the front lens guide member 18. Further, the rotation of the second cylinder 15 causes the rear lens frame 24 (rear lens element group L2) to move along a predetermined path in the optical axis direction O due to the relationships between the cam grooves 15d and the cam pins 24b and between the keys 24a of the rear lens frame 24 and the rear lens group guiding slots 18b of the front lens element guide member 18 to thereby effect zooming.

As explained above, when the rotation cylinder 12 is driven, the first cylinder 14 linearly moves in the optical axis direction O, and when the second cylinder 15 is rotated in relation to the first cylinder 14, the second cylinder 15 moves in the optical axis direction O while rotating. As a result, the front lens group L1 and the rear lens group L2 linearly move while the distance between the two lens groups changes to effect zooming.

Next, a driving mechanism for rotating the second cylinder 15 will be explained. The driving mechanism transmits the rotation of the cylinder 12 to the second cylinder 15. A pair of gear supporting plates 26 and 27 are secured to the rear end of the first cylinder 14 through fastening screws 29. A pinion 30 engaging the inclined inner gear 12d of the rotation cylinder 12 is rotatably attached to the gear supporting plate 26. The pinion 30 is accommodated in a space 14f formed in a straight guide projection 14e which is formed on the rear end portion of the first cylinder 14. A part of the teeth of the pinion 30 projects from the outer surface of the guide projection 14e. The guide projection 14e is slidable in a guide groove 11g (FIG. 9) which is formed on the inner cylinder 11a and extends in a direction parallel to the optical axis O. The inclined inner gear 12d of the rotation cylinder 12 is parallel to the lead grooves 12c, so that the engagement between the pinion 30 and the inclined inner gear 12d is maintained, even when the first cylinder 14 moves in the optical axis direction O due to the rotation of the cylinder 12. A gear train 31, including a final gear 31a and idle gears 31b and 31c, is supported between the gear supporting plates 26 and 27 to receive the rotation of the pinion 30. A rotation transmitting shaft 32 forwardly extends along the optical axis O and is integrally formed with the final gear 31a. The shaft 32 has a uniform cross section which is not round.

A pinion 33 is supported on the guide plate 17 fixed to the rear end surface of the guide member 16. The pinion fits on the shaft 32 such that the pinion 33 is slidable on the shaft in the axial direction thereof, but does not rotate with respect to the shaft 32. In other words, the pinion 33 is movable with respect to the shaft 32 in the axial direction thereof and rotatable together with the shaft 32. Thus, the pinion 33 moves along the shaft 32 together with the guide plate 17 (and the second cylinder 15) when the second cylinder 15 moves in the optical axis direction O. The pinion 33 meshes with a circumferential inner gear 15e which is formed on the inner surface of the second cylinder 15. Therefore, the rotation of the rotation cylinder 12 is transmitted to the second cylinder 15 through the inclined inner gear 12d, the pinion 30, the gear train 31, the rotation transmitting shaft 32, the pinion 33 and the circumferential inner gear 15e, regardless of the position of the first cylinder 14 in the direction of the optical axis O.

In the zoom lens barrel 9, with the above construction according to the present invention, when the rotation cylinder 12 is rotated, the first cylinder 14 moves in the optical axis direction O and the second cylinder 15 rotates. The rotation of the second cylinder 15 allows the second cylinder 15 itself to move in the optical axis direction O, and the front lens group L1 and the rear lens group L2 to linearly move while changing the distance between the two lens groups to thereby effect zooming.

Figure 9:
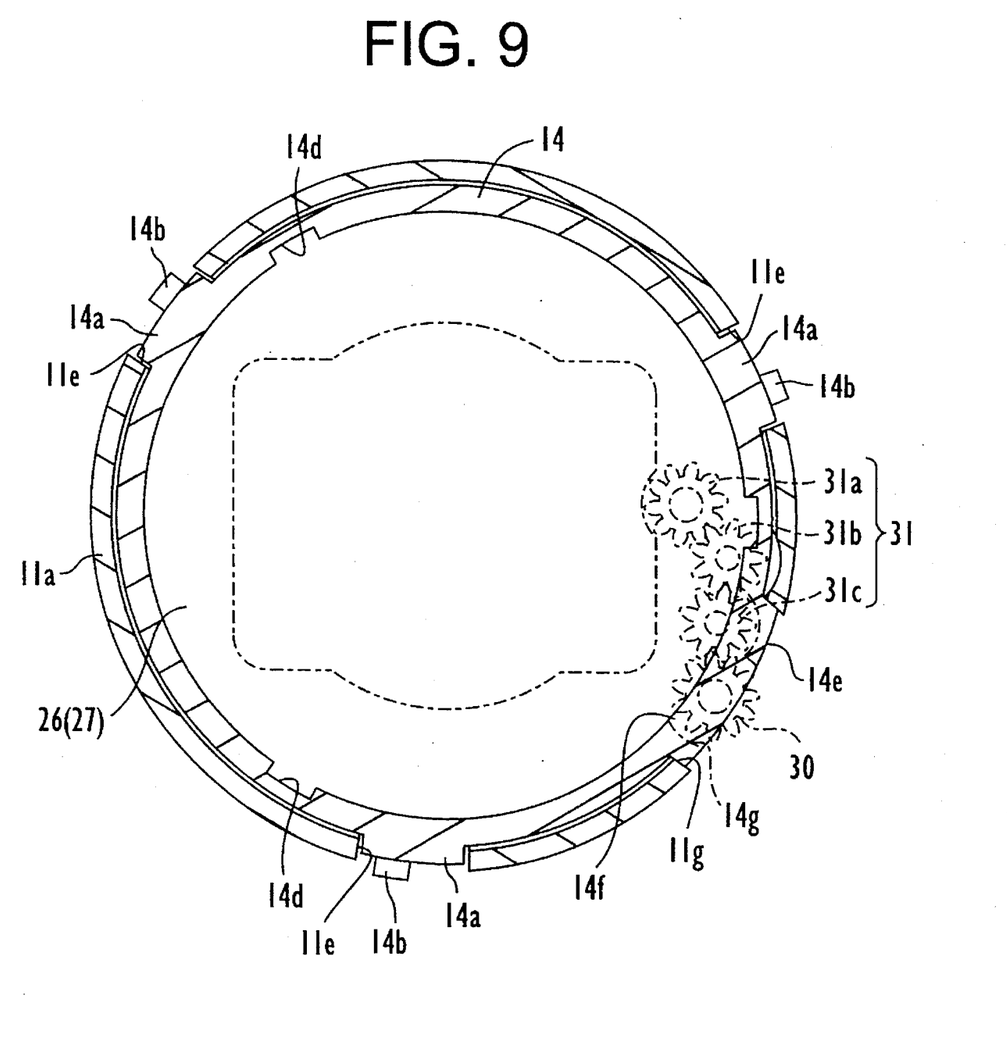
FIG. 9 is a front view showing the relationship in position between a guide projection on a first cylinder, a pinion and a gear train; and, FIG. 10 is an isometric view of the first cylinder wherein a gear supporting plate, the pinion and so forth are assembled.
Figure 10:
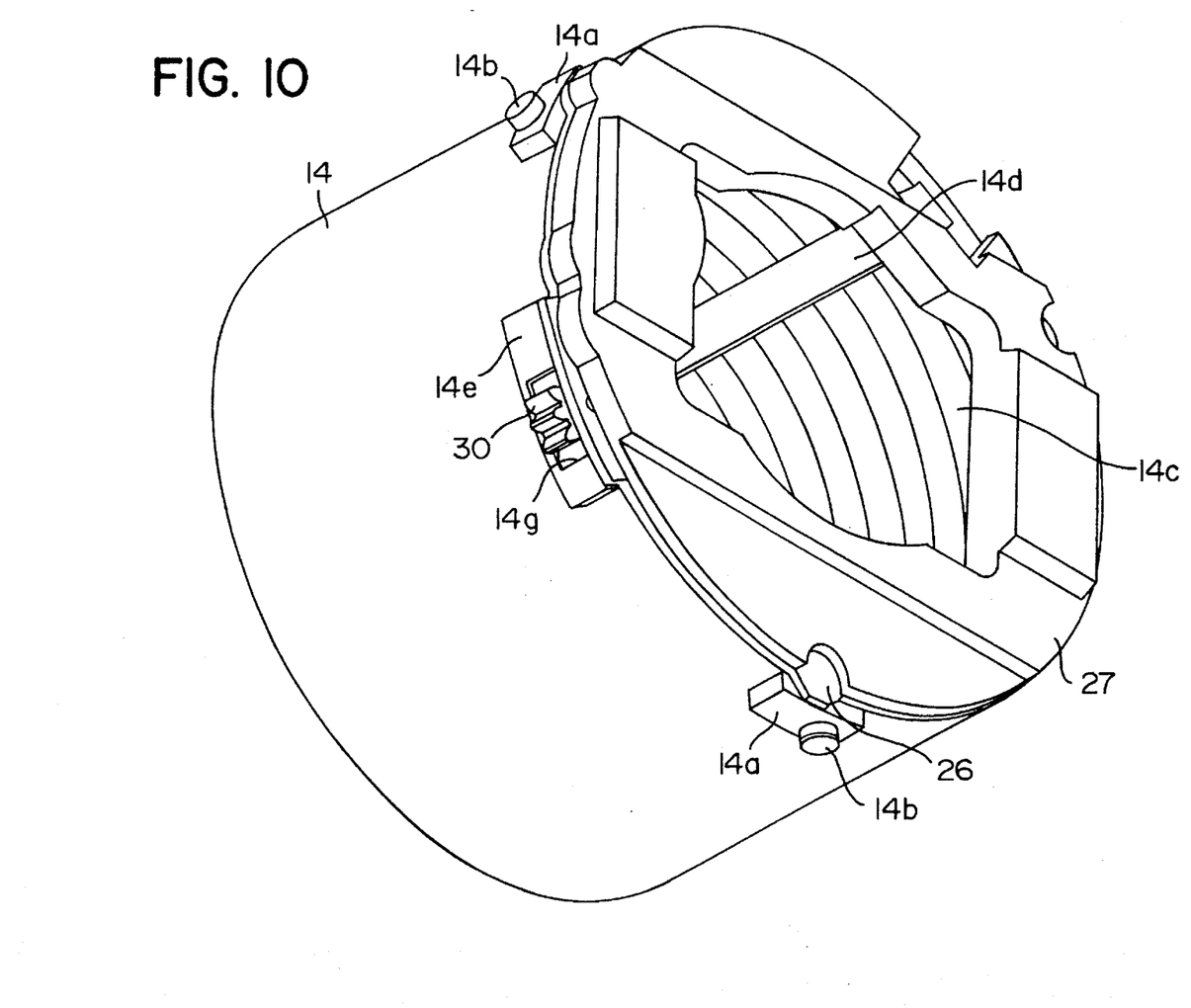

In the zoom lens barrel 9, according to the present invention, as best shown in FIG. 9, the pinion 30 for transmitting the driving force from the rotation cylinder 12 to the gear train 31 is placed close to the guide projection 14e engaging the guide groove 11g. With such a configuration, the portion of the first cylinder 14 for supporting the pinion 30 is stiff and hard to bend. As a result, the reduction in the driving force transmitting efficiency using the pinion is prevented without increasing the overall stiffness of the linearly movable cylinder supporting the pinion 30.

As described above, with the guide device for a zoom lens barrel according to the present invention, a straight guide projection is formed on an outer surface of a linearly movable cylinder, and a pinion is situated in the vicinity of the guide projection. As a result, a decrease in the transmitting efficiency of the driving force using the pinion is prevented without increasing the overall stiffness of the movable cylinder supporting the pinion.

We claim:

1. A guide device for a zoom lens barrel, comprising:
  a movable cylinder linearly guided in a direction of an optical axis of a zoom lens;
  a pinion rotatably supported on said movable cylinder, a part of said pinion projecting from an outer surface of said movable cylinder;
  driving means for rotating said pinion;
  zooming means for moving a plurality of lens groups of said zoom lens by said rotation of said pinion to change a focal length; and,
  a straight guide projection formed on an outer surface of said movable cylinder, wherein said pinion is situated close to said straight guide projection.

2. The guide device for a zoom lens barrel of claim 1, further comprising a notch formed on said straight guide projection, wherein said part of said pinion projects through said notch.

3. The guide device for a zoom lens barrel of claim 1, wherein said movable cylinder is provided on a rear end with a gear supporting plate, and wherein said gear supporting plate rotatably supports said pinion.

4. The guide device for a zoom lens barrel of claim 1, further comprising a fixed cylinder in which said movable cylinder is accommodated; a straight guide groove formed on said fixed cylinder and engaging said straight guide projection; a rotation cylinder accommodated between said movable cylinder and said fixed cylinder; and an inclined inner gear formed on an inner wall of said rotation cylinder and engaging said pinion.

5. The guide device for a zoom lens barrel of claim 4, further comprising a spur gear formed on an outer periphery of said rotation cylinder, and a drive pinion mounted to said fixed cylinder and engaging said spur gear.

6. A guide device for a zoom lens barrel, comprising:
  a movable cylinder linearly guided in a direction of an optical axis of a zoom lens;
  a guide projection formed on an outer periphery of said movable cylinder; and,
  a pinion, said pinion having teeth, said pinion rotatably supported on said movable cylinder such that a portion of said teeth project from an outer periphery of said guide projection.

7. The guide device for a zoom lens barrel according to claim 1, about an axis parallel to the optical axis of the zoom lens.

8. The guide device for a zoom lens barrel according to claim 1, further comprising means for supporting said pinion for rotation about an axis extending within said movable cylinder.

9. The guide device for a zoom lens barrel according to claim 1, said straight guide projection being formed on an outer surface of said movable cylinder for movement together with said movable cylinder.

10. The guide device for a zoom lens barrel according to claim 1, a part of said pinion extending within said movable cylinder.

11. The guide device for a zoom lens barrel according to claim 1, further comprising an inclined gear provided on an inner wall of a cylinder, said pinion engaging said inclined gear.

12. The guide device for a zoom lens barrel according to claim 1, further comprising an aperture extending through a wall of said movable cylinder, said part of said pinion projecting through said aperture.

13. The guide device for a zoom lens barrel according to claim 6, said guide projection guiding said movable cylinder for linear movement along the optical axis.

14. The guide device for a zoom lens barrel according to claim 6, said guide projection including an aperture, said teeth of said pinion projecting through said aperture.

15. A guide device for a zoom lens barrel, said guide device comprising:

a movable cylinder linearly guided in a direction of an optical axis of a zoom lens;

a pinion rotatably supported on said movable cylinder, a portion of said pinion projecting from an outer surface of said movable cylinder;

means for rotating said pinion, to move a plurality of lens groups to change a focal length of the zoom lens; and a straight guide projection formed on an outer surface of said movable cylinder, said pinion positioned adjacent to said straight guide projection.

16. The guide device for a zoom lens barrel according to claim 15, further comprising means for supporting said pinion for rotation about an axis parallel to the optical axis of the zoom lens.

17. The guide device for a zoom lens barrel according to claim 15, said straight guide projection integrally formed on an outer surface of said movable cylinder.

18. The guide device for a zoom lens barrel according to claim 15, a portion of said pinion being positioned within said movable cylinder.

19. The guide device for a zoom lens barrel according to claim 15, said straight guide projection including an aperture, said pinion projecting from an outer surface of said movable cylinder through said aperture.

20. The guide device for a zoom lens barrel according to claim 15, said pinion engaging an inclined gear formed on an inner wall of a rotation cylinder of the zoom lens barrel.

* * * * *

UNITED STATES PATENT AND TRADEMARK OFFICE
CERTIFICATE OF CORRECTION

PATENT NO. : 5,581,411
DATED : December 3, 1996
INVENTOR(S) : H. NOMURA et al.

It is certified that error appears in the above-indentified patent and that said Letters Patent is hereby corrected as shown below:

On the title page, in section [56], "References Cited", "U.S. PATENT DOCUMENTS", add ---B1-4,944,030   5/1993 Haraguchi et al.   354/403---.

At column 6, line 41 (claim 7, line 2), after "claim 1," insert ---further comprising means for supporting said pinion for rotation---.

Signed and Sealed this

First Day of April, 1997

BRUCE LEHMAN

*Attest:*

*Attesting Officer*   Commissioner of Patents and Trademarks